(12) United States Patent
Lee

(10) Patent No.: US 10,179,707 B2
(45) Date of Patent: Jan. 15, 2019

(54) TRANSFER APPARATUS

(71) Applicant: ACE MACHINARY CO., LTD., Siheung-si, Gyeonggi-do (KR)

(72) Inventor: Chul Lee, Incheon (KR)

(73) Assignee: ACE MACHINARY CO., LTD., Siheung-si, Gyeonggi-do (KR)

( * ) Notice: Subject to any disclaimer, the term of this patent is extended or adjusted under 35 U.S.C. 154(b) by 103 days.

(21) Appl. No.: 15/314,940

(22) PCT Filed: Jun. 30, 2016

(86) PCT No.: PCT/KR2016/007035
§ 371 (c)(1),
(2) Date: Dec. 15, 2016

(87) PCT Pub. No.: WO2018/004034
PCT Pub. Date: Jan. 4, 2018

(65) Prior Publication Data
US 2018/0215556 A1 Aug. 2, 2018

(51) Int. Cl.
*B65G 13/11* (2006.01)
*B65G 21/10* (2006.01)
*B65G 37/00* (2006.01)
*B65G 51/03* (2006.01)
*B65G 47/244* (2006.01)
(Continued)

(52) U.S. Cl.
CPC .............. *B65G 51/03* (2013.01); *B65G 13/11* (2013.01); *B65G 21/10* (2013.01); *B65G 21/2063* (2013.01); *B65G 37/00* (2013.01); *B65G 37/005* (2013.01); *B65G 47/244* (2013.01);
(Continued)

(58) Field of Classification Search
CPC ............................ B65G 47/244; B65G 47/682
USPC .......... 198/415, 416, 452, 457.02, 575, 602, 198/620, 689.1, 803.5, 817, 955
See application file for complete search history.

(56) References Cited

U.S. PATENT DOCUMENTS 2,895,593 A * 7/1959 McKnight ............ B65G 19/306
193/1
4,807,739 A * 2/1989 Wolf ................... B65G 47/2445
198/415
(Continued)

FOREIGN PATENT DOCUMENTS

JP 08-324786 A 12/1996
JP 5372465 B2 12/2013
(Continued)

OTHER PUBLICATIONS

International Search Report for PCT/KR2016/007035 dated Mar. 29, 2017 from Korean Intellectual Property Office.

*Primary Examiner* — Douglas A Hess
(74) *Attorney, Agent, or Firm* — Revolution IP, PLLC

(57) ABSTRACT

The present invention relates to a transfer apparatus, and the transfer apparatus includes: a first transfer module holding an object to be transferred on the top thereof and transferring the object to be transferred at a first speed in a longitudinal direction; a second transfer module disposed in parallel with the first transfer module and holding the object to be transferred on the top thereof and transferring the object to be transferred at a second speed in the longitudinal direction; and a blowing module causing air to flow upward/downward below at least one of the first transfer module and the second transfer module.

9 Claims, 11 Drawing Sheets

(51) Int. Cl.
*B65G 47/68* (2006.01)
*B65G 21/20* (2006.01)
*B65G 47/76* (2006.01)

(52) U.S. Cl.
CPC ......... *B65G 47/682* (2013.01); *B65G 47/763* (2013.01); *B65G 2201/025* (2013.01)

(56) References Cited

U.S. PATENT DOCUMENTS

| | | | | |
|---|---|---|---|---|
| 5,139,253 | A * | 8/1992 | Bohme | B65H 5/24 271/197 |
| 6,164,431 | A * | 12/2000 | Morisod | B65G 21/2036 198/415 |
| 6,216,848 | B1 * | 4/2001 | Zens | B65H 5/224 198/689.1 |
| 6,471,044 | B1 * | 10/2002 | Isaacs | B65G 43/08 198/347.4 |
| 7,552,815 | B2 * | 6/2009 | Pahud | B65G 21/2036 198/394 |
| 7,703,597 | B2 * | 4/2010 | Jansen | B65G 47/2445 198/415 |
| 7,905,195 | B2 * | 3/2011 | Yamasaki | H01L 21/67784 118/300 |
| 7,908,995 | B2 * | 3/2011 | Inamasu | B65G 49/065 118/300 |
| 8,066,282 | B2 * | 11/2011 | Muller | B65B 5/021 271/276 |
| 8,636,139 | B2 * | 1/2014 | Umezawa | B65G 15/12 198/689.1 |
| 9,073,704 | B2 * | 7/2015 | Fourney | B65G 47/46 |
| 9,581,840 | B2 * | 2/2017 | Zhang | B65G 15/12 |
| 9,708,132 | B2 * | 7/2017 | Coullery | B65G 47/244 |

FOREIGN PATENT DOCUMENTS

| | | |
|---|---|---|
| KR | 20-0339636 Y1 | 1/2004 |
| KR | 10-0670625 B1 | 1/2007 |
| KR | 10-0768086 B1 | 10/2007 |
| KR | 10-2011-0061537 A | 6/2011 |
| KR | 10-2013-0131526 A | 12/2013 |
| KR | 10-1507905 B1 | 4/2015 |

* cited by examiner

[Fig. 1]
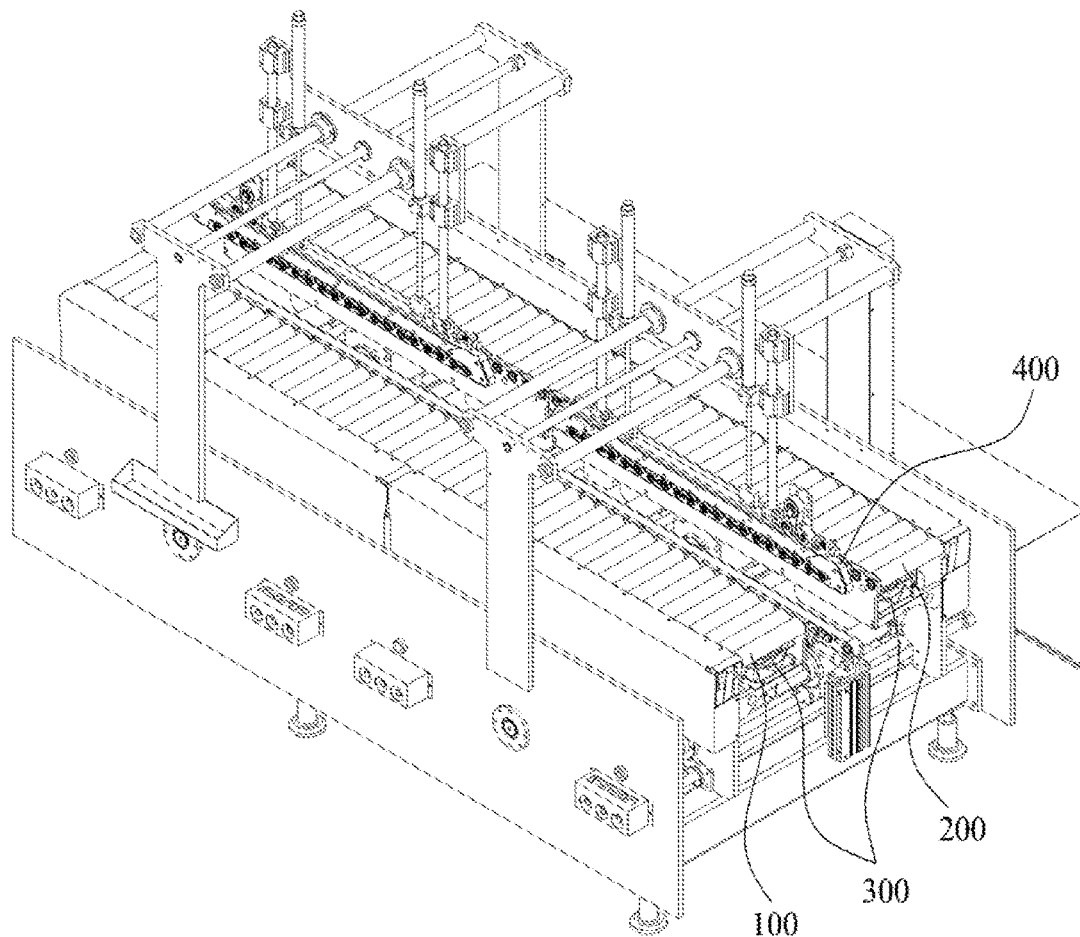
[Fig. 2]
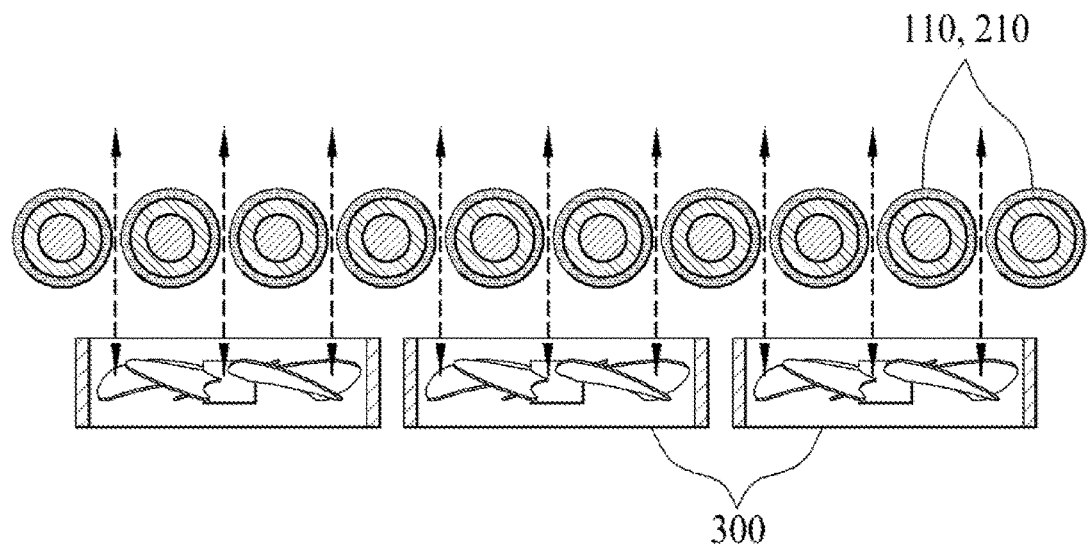

[Fig. 3]
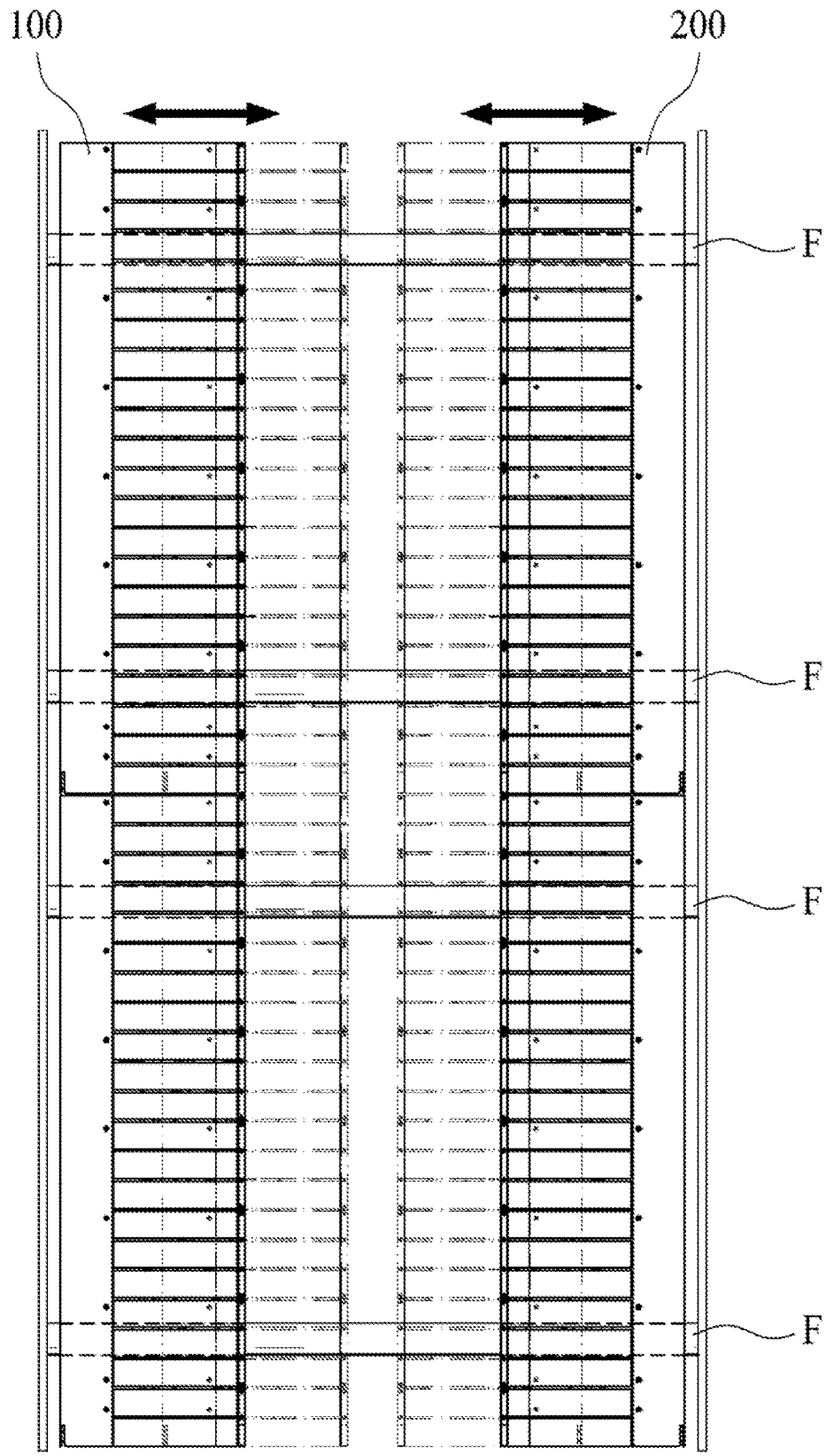

[Fig. 4]
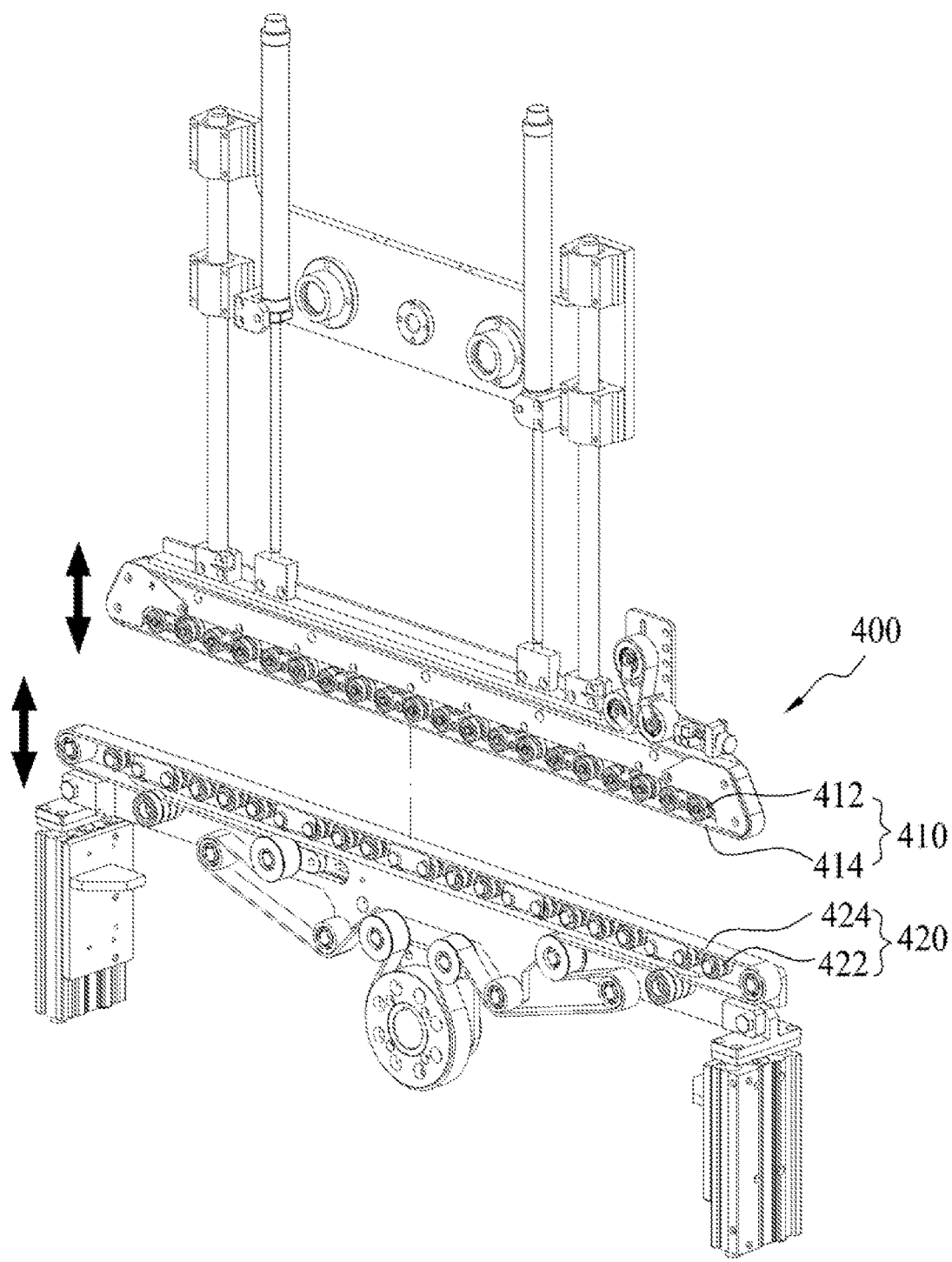

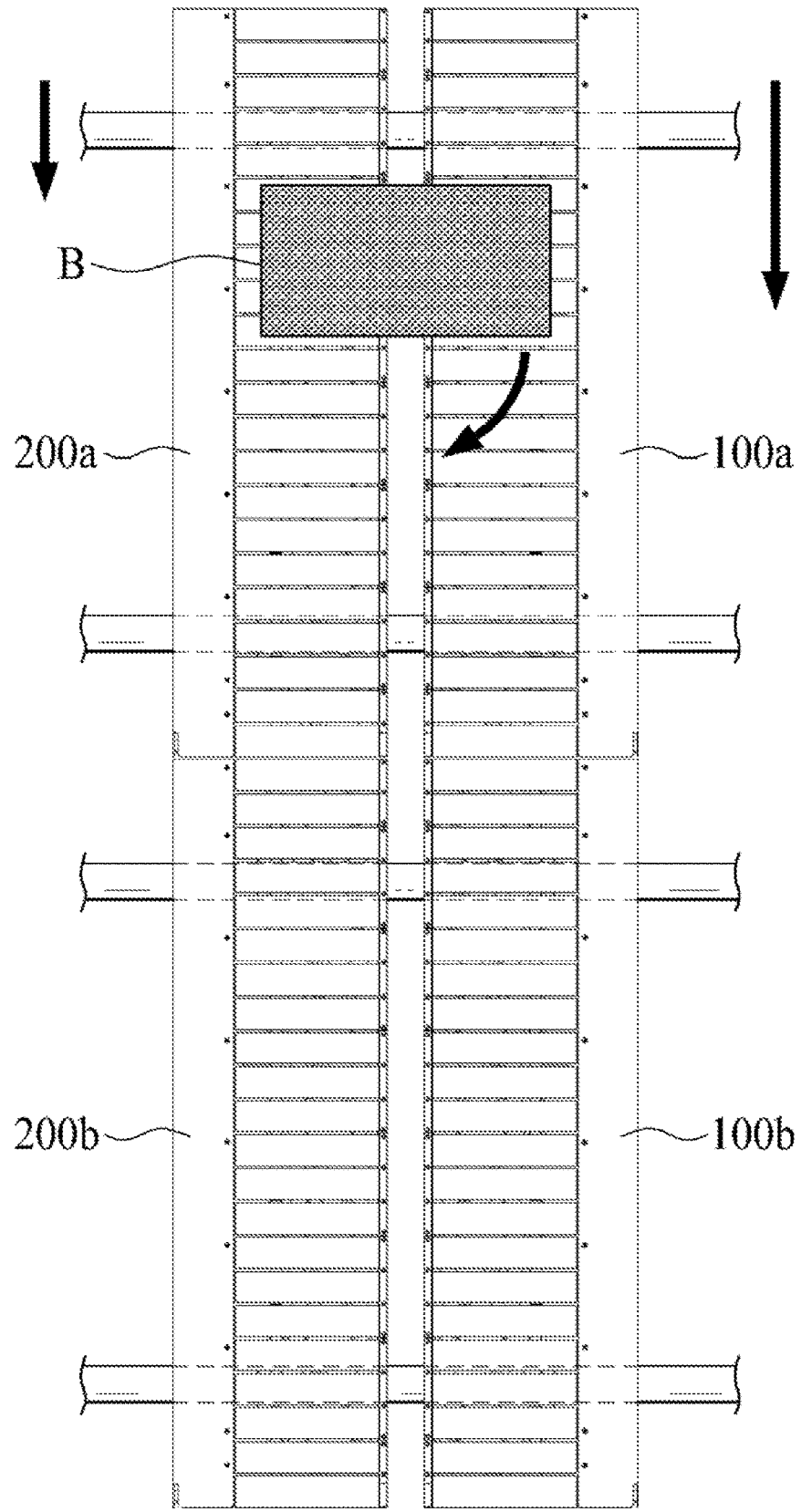
[Fig. 5]

[Fig. 6]
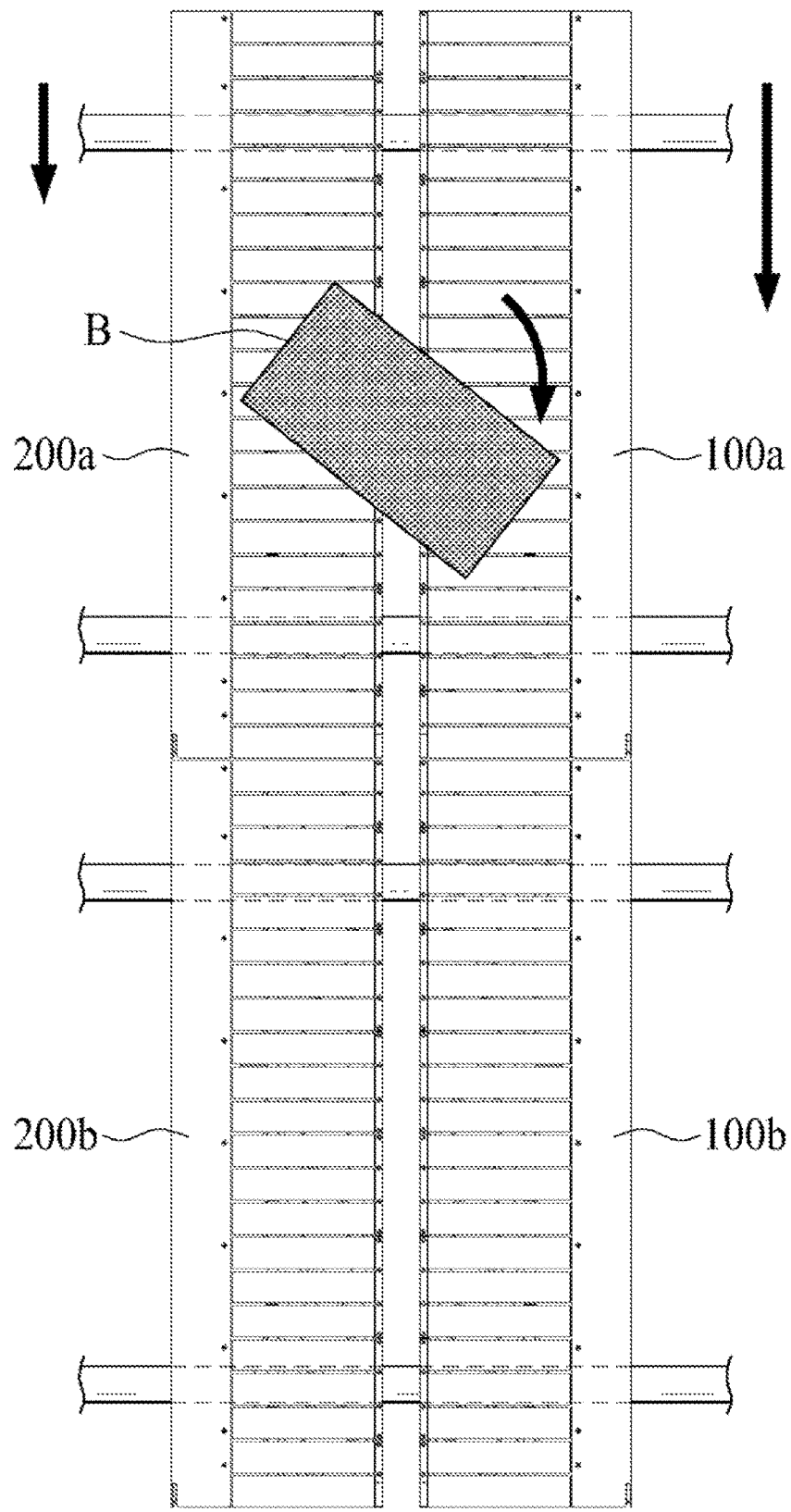

[Fig. 7]
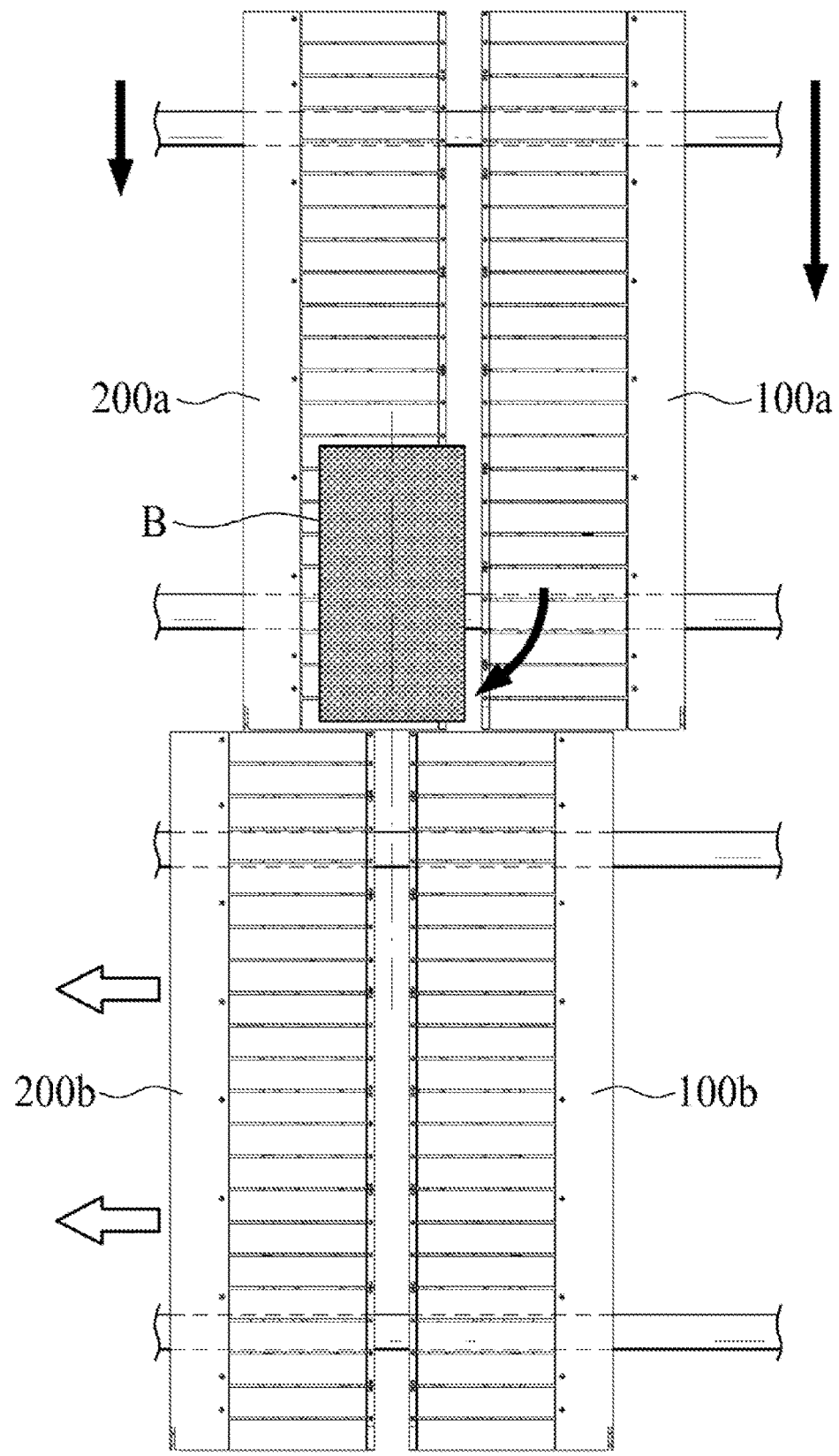

[Fig. 8]
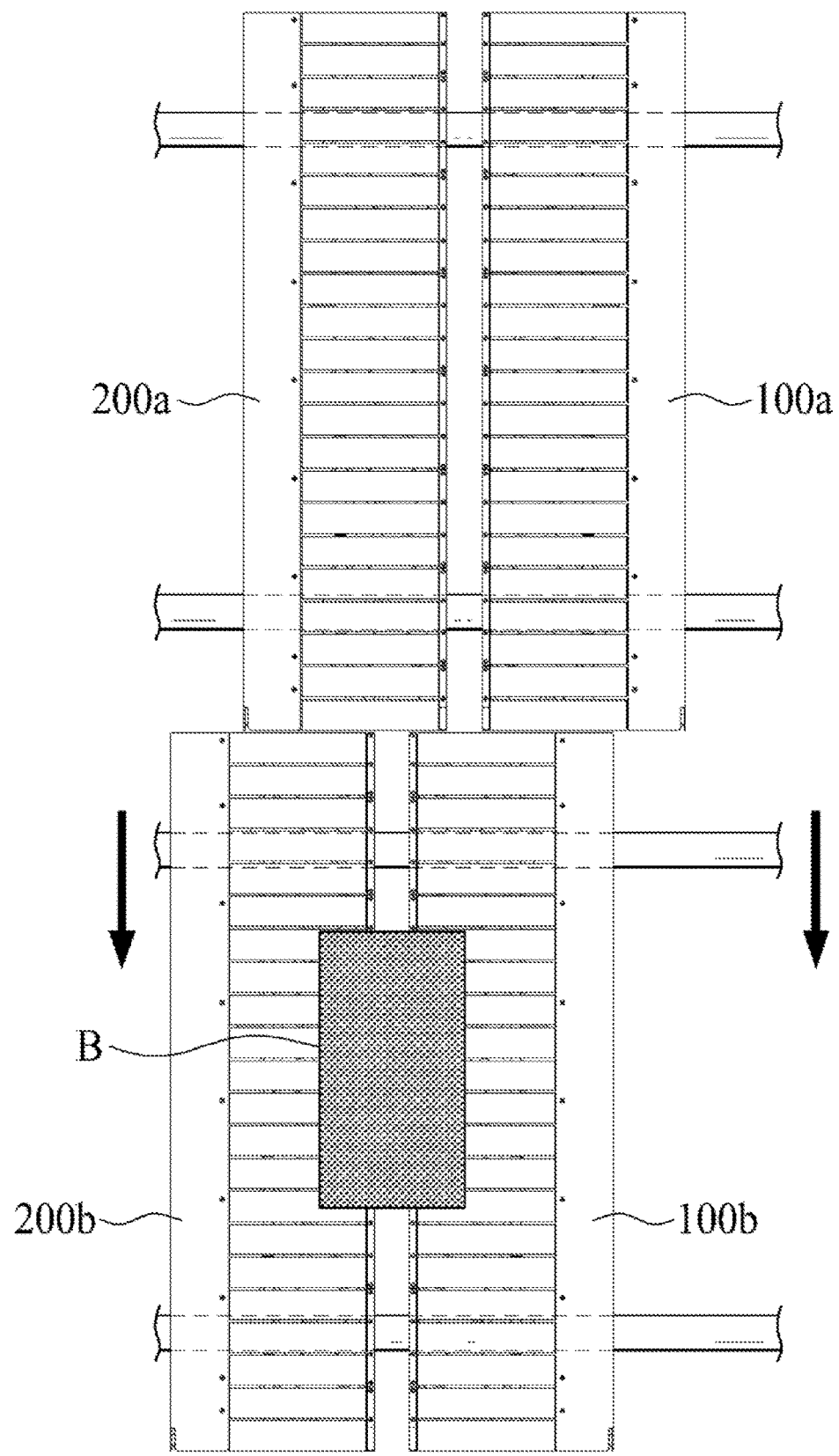

[Fig. 9]
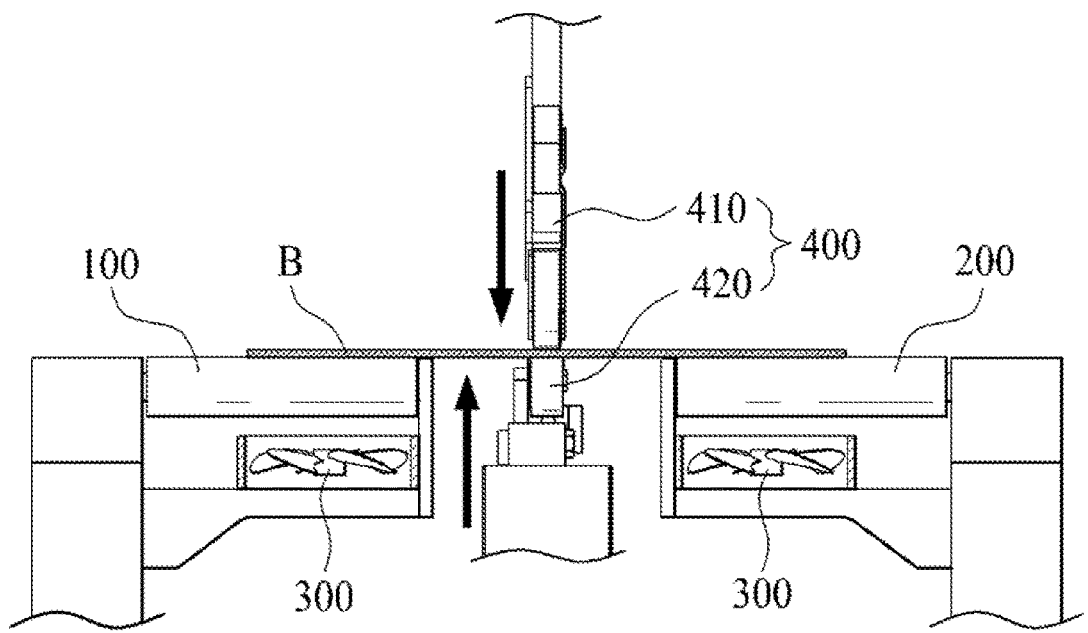
[Fig. 10]
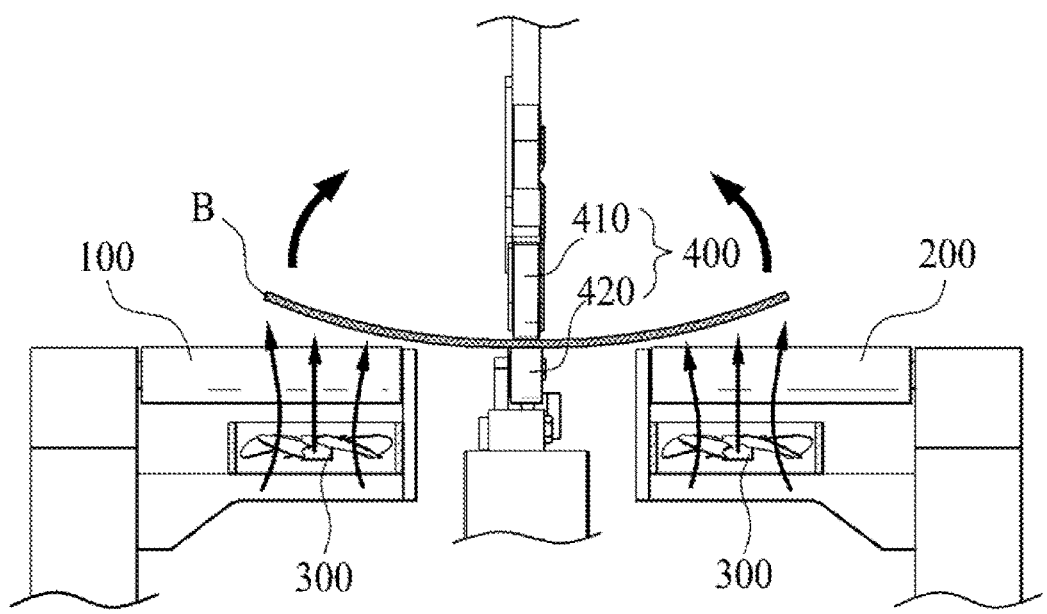

[Fig. 11]
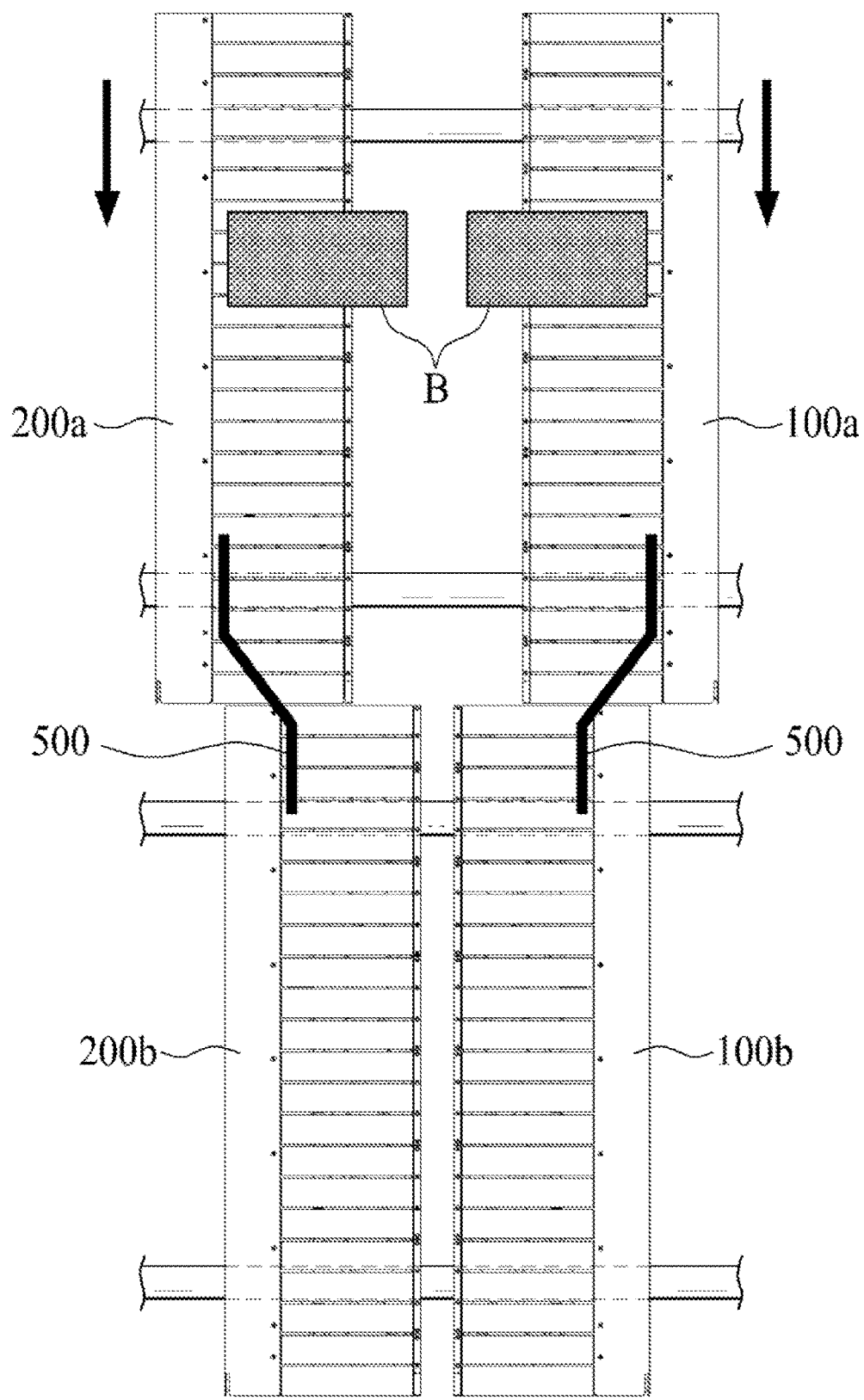

[Fig. 12]
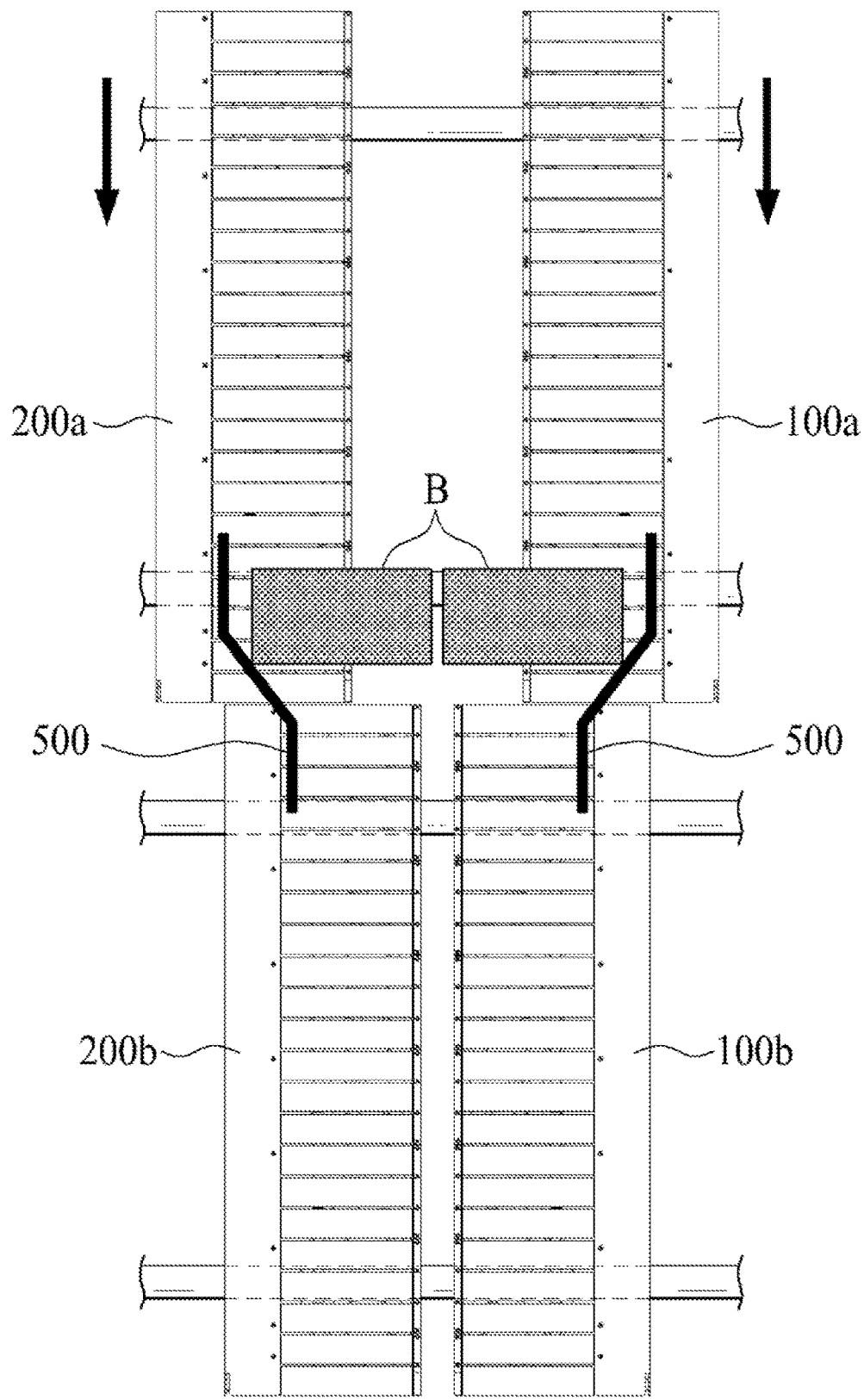

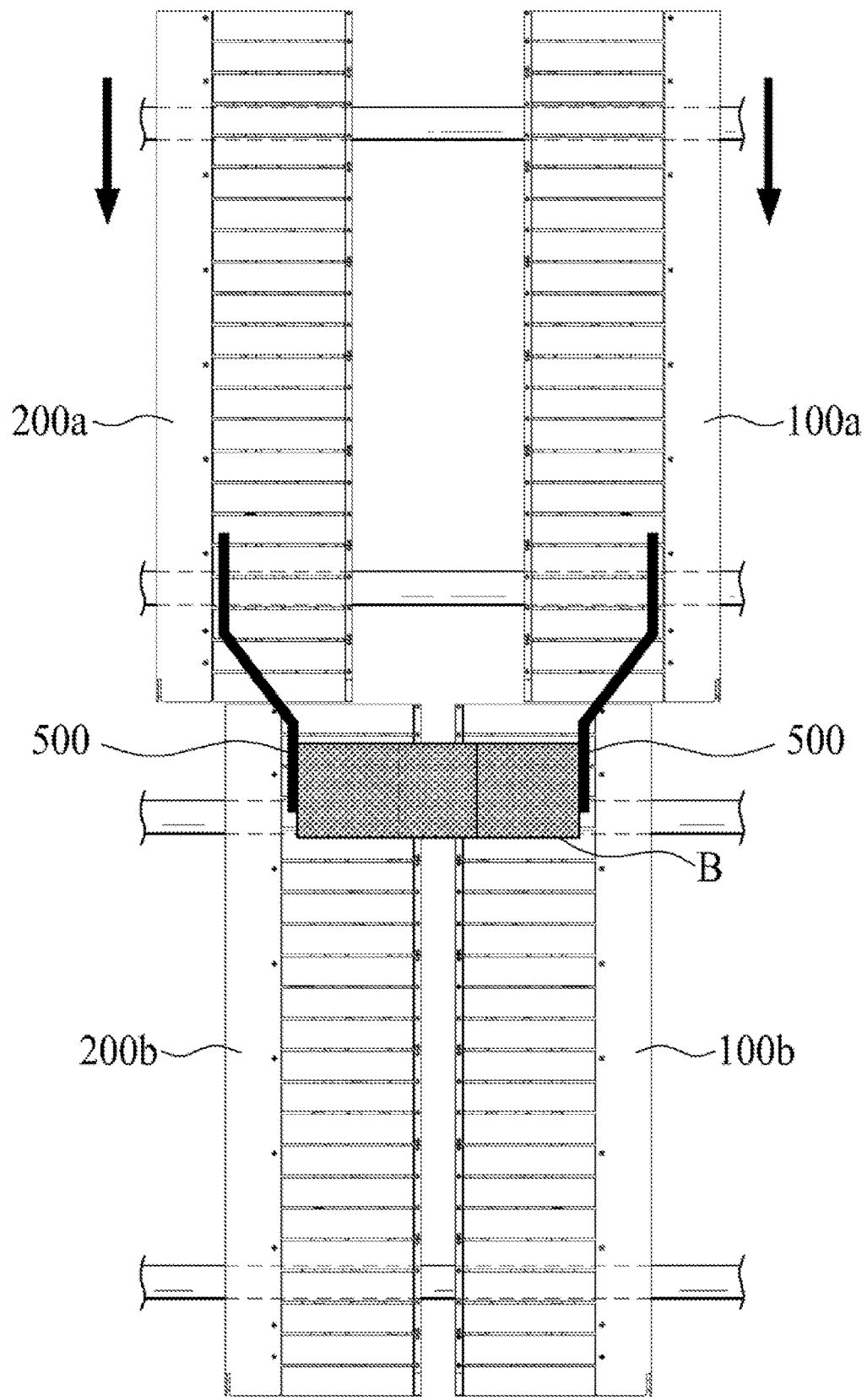
[Fig. 13]

TRANSFER APPARATUS

TECHNICAL FIELD

The present invention relates to a transfer apparatus, and more particularly, to a transfer apparatus which can transfer an object to be transferred by various methods and easily perform management and maintenance of the transfer apparatus.

BACKGROUND ART

In general, apparatuses having various configurations, which are used for transferring articles, are widely used.

In particular, among them, a method is widely used, which hold various articles on the top of a configuration including a roller or a belt and transfers the articles through rotation of the roller or belt.

In this case, the roller and the belt directly contact the object to be transferred and are abraded by friction with the object to be transferred.

Therefore, in the case of the transfer apparatus which is used for a certain period of time, the roller or belt needs to be periodically replaced.

Accordingly, there is a problem in that large management and maintenance cost is consumed in order to replace all rollers or belts of the transfer apparatus.

Further, when the transfer apparatus is used for manufacturing products, there are a lot of cases in which various operations such as rotation or bonding of the object to be transferred are performed.

In this case, while the object to be transferred is transferred through the transfer apparatus, there is a problem in that it is difficult to perform a precise operation with respect to the object to be transferred.

Further, it is difficult that various devices required for an operation for the object to be transferred are provided in the transfer apparatus and the transfer apparatus including the devices may be used only for purposes thereof, and as a result, there is a problem in that universality decreases.

DISCLOSURE

Technical Problem

In order to solve the problems mentioned in the background art, an embodiment of the present invention is directed to provide a transfer apparatus which can transfer an object to be transferred by various methods and easily perform management and maintenance of the transfer apparatus.

The technical objects of the present invention are not limited to the aforementioned technical objects, and other technical objects, which are not mentioned above, will be apparently appreciated by a person having ordinary skill in the art from the following description.

Technical Solution

According to an aspect of the present invention, an transfer apparatus includes: a first transfer module holding an object to be transferred on the top thereof and transferring the object to be transferred at a first speed in a longitudinal direction; a second transfer module disposed in parallel with the first transfer module and holding the object to be transferred on the top thereof and transferring the object to be transferred at a second speed in the longitudinal direction; and a blowing module causing air to flow upward/downward below at least one of the first transfer module and the second transfer module.

Herein, the blowing module may cause the air to flow downward while at least one of the first transfer module and the second transfer module transfers the object to be transferred.

Further, the first transfer module and the second transfer module may be formed to move in a transverse direction.

In addition, the first speed and the second speed of the first transfer module and the second transfer module may be set to be different from each other.

Moreover, the transfer apparatus may further include a third transfer module disposed in parallel with the first transfer module and the second transfer module and transferring the object to be transferred in the longitudinal direction.

In this case, the third transfer module may be provided between the first transfer module and the second transfer module.

Further, the third transfer module may have a relatively smaller width than the first transfer module and the second transfer module.

In addition, the third transfer module may include a lower transfer unit transferring the object to be transferred by contacting the bottom of the object to be transferred and an upper transfer unit transferring the object to be transferred by contacting the top of the object to be transferred.

In this case, the lower transfer unit and the upper transfer unit may be formed to move upward/downward so as to selectively contact the object to be transferred.

Meanwhile, the blowing module may cause the air to flow upward while the third transfer module transfers the object to be transferred.

Meanwhile, the transfer apparatus may further include a guide module of which the width decreases in a direction in which the object to be transferred is transferred so that the objects to be transferred, which the first and second transfer modules transfer, contact each other.

Advantageous Effects

By the transfer apparatus according to the present invention, the following effects can be achieved expected.

First, objects to be transferred, which have various shapes can be transferred by a desired method.

Second, cost which is consumed for management and maintenance of a transfer apparatus can be reduced.

Third, since various operations can be performed with respect to the objects to be transferred during transferring the objects to be transferred, efficiency of various operations can be enhanced.

The effects of the present invention are not limited to the aforementioned effect, and other effects, which are not mentioned above, will be apparent to a person having ordinary skill in the art from description of claims.

BRIEF DESCRIPTION OF THE DRAWINGS

FIG. 1 is a diagram illustrating a configuration of a transfer apparatus according to an exemplary embodiment of the present invention.

FIG. 2 is a diagram illustrating a configuration of a blowing module of the transfer apparatus according to the exemplary embodiment of the present invention.

FIG. 3 is a diagram illustrating a state in which a first transfer module and a second transfer module of the transfer apparatus are moving transversely according to the exemplary embodiment of the present invention.

FIG. 4 is a diagram illustrating a configuration of a third transfer module of the transfer apparatus according to the exemplary embodiment of the present invention.

FIGS. 5 to 8 are diagrams illustrating a first use aspect of the transfer apparatus according to the exemplary embodiment of the present invention.

FIGS. 9 and 10 are diagrams illustrating a second use aspect of the transfer apparatus according to the exemplary embodiment of the present invention.

FIGS. 11 to 13 are diagrams illustrating a third use aspect of the transfer apparatus according to the exemplary embodiment of the present invention.

EXPLANATION OF REFERENCE NUMERALS

100: First transfer module
200: Second transfer module
300: Blowing module
400: Third transfer module
410: Upper transfer unit
420: Lower transfer unit
500: Guide module

BEST MODE FOR THE INVENTION

Hereinafter, an exemplary embodiment of the present invention will be described in detail with reference to the accompanying drawings. However, in describing the present invention, a detailed description of already known functions or configurations will be omitted so as to make the subject matter of the present invention clear.

Moreover, in describing the present invention, terms indicating directions such as front/rear or upper/lower are disclosed so as for those skilled in the art to clearly appreciate the directions and since the terms indicate relative directions, claims are limited thereto.

Configuration of Transfer Apparatus

First, a configuration of a transfer apparatus according to an exemplary embodiment of the present invention will be described in detail with reference to FIGS. 1 to 4.

Herein, FIG. 1 is a diagram illustrating a configuration of a transfer apparatus according to an exemplary embodiment of the present invention, FIG. 2 is a diagram illustrating a configuration of a blowing module of the transfer apparatus according to the exemplary embodiment of the present invention, FIG. 3 is a diagram illustrating a state in which a first transfer module and a second transfer module of the transfer apparatus are moving transversely according to the exemplary embodiment of the present invention, and FIG. 4 is a diagram illustrating a configuration of a third transfer module of the transfer apparatus according to the exemplary embodiment of the present invention.

As illustrated in FIGS. 1 to 4, the apparatus according to the exemplary embodiment of the present invention as an apparatus for transferring an object to be transferred may include a first transfer module 100, a second transfer module 200, a blowing module 300, and a third transfer module 400.

In the exemplary embodiment, a configuration in which the transfer apparatus transfers a box as the object to be transferred is described, but the present invention is not limited thereto and the transfer apparatus may be universally used in a flexible plate type object to be transferred and besides, the object to be transferred is not limited to the type of the object to be transferred and may be variously applied.

First, the first transfer module 100 as a configuration that holds the object to be transferred on the top thereof and moves the object to be transferred may transfer the object to be transferred at a first speed in the longitudinal direction.

In more detail, in the exemplary embodiment, in the first transfer module 100, a plurality of rollers 110 are configured to be arranged, and as a result, each roller 110 may rotate and transfer the object to be transferred, which is held on the top in a rotational direction of the roller 110.

The roller 110 is formed in a general cylindrical shape and various materials such as metal or rubber may be applied to the surface of each roller 110 according to characteristics of the object to be transferred.

Further, the configuration of each roller 110 may be advantageous to rotate so as to transfer the object to be transferred at a first speed and all rollers 110 may be configured to rotate at the same speed or the respective rollers 110 may be configured to rotate at different speeds.

In this case, the first speed may be advantageous to be configured so as to apply various speeds according to a configuration of a user.

In addition, each roller 110 is disposed so that a predetermined interval is formed between adjacent rollers 110 may be advantageous to be formed so that air flows by penetrating the top and the bottom of the first transfer module 100.

The configuration of the first transfer module 100 is not limited to the exemplary embodiment and may hold the object to be transferred on the top and transfer the object and if the configuration of the first transfer module 100 is formed so that the air is in communication between the top and the bottom, various types and configurations may be applied.

Meanwhile, the second transfer module 200 is a configuration for transferring the object to be transferred in the longitudinal direction by holding the object to be transferred on the top similarly to the first transfer module 100 and the second transfer module 200 may transfer the object to be transferred at a second speed.

In this case, the second speed may be set to be the same as the first speed of the first transfer module 100 or to be different from the first speed of the first transfer module 100.

Further, the second transfer module 200 as a similar configuration as the first transfer module 100 may be formed to have a configuration which is the same as the aforementioned configuration.

In more detail, the second transfer module 200 is formed in a form in which the plurality of rollers 210 is arranged and the respective rollers 210 are spaced apart from each other at a predetermined interval to be formed so that the air flows by penetrating the top and the bottom of the second transfer module 200.

Such a configuration of the second transfer module 200 is not also limited to the exemplary embodiment and may hold the object to be transferred on the top and transfer the object and if the configuration of the second transfer module 200 is formed so that the air is in communication between the top and the bottom, various types and configurations may be applied.

The second transfer module 200 is disposed in parallel to the first transfer module 100 to transfer a single object to be transferred together with the first transfer module 100 or a separate object to be transferred separately from the first transfer module 100.

In this case, the first transfer module 100 and the second transfer module 200 may be configured to move in the transverse direction.

In more detail, in the exemplary embodiment, a frame F penetrating the first transfer module 100 and the second transfer module 200 in the transverse direction is provided and the first transfer module 100 and the second transfer module 200 may move in the transverse direction along the frame F.

Further, the first transfer module 100 and the second transfer module 200 may be advantageously configured to include separate driving devices, respectively to separately move.

That is, a distance between the first transfer module 100 and the second transfer module 200 may be arbitrarily controlled.

Meanwhile, the blowing module 300 may be a component that causes the air to flow upward/downward below at least one of the first transfer module 100 and the second transfer module 200.

In the exemplary embodiment, the blowing module 300 is provided below both the first transfer module 100 and the second transfer module 200 to cause the air to flow by penetrating the tops and the bottoms of the first transfer module 100 and the second transfer module 200.

In more detail, the blowing module 300 may be configured in a form in which a plurality of fans is provided below both the first transfer module 100 and the second transfer module 200 and configured to selectively generate the air to flow to the top or the bottom through a rotational direction of the fan.

The flow of the air caused by the blowing module 300 influences the object to be transferred on the tops of the first transfer module 100 and the second transfer module 200 and the object to be transferred may be configured to be transferred by various methods.

The configuration will be described below in more detail in a use aspect of the transfer apparatus according to the present invention.

Meanwhile, the third transfer module 400 as a component for transferring the object to be transferred in the longitudinal direction may be disposed in parallel to the first transfer module 100 and the second transfer module 200 in parallel.

In the exemplary embodiment, the third transfer module 400 as a component that just transfers the object to be transferred in the longitudinal direction may be configured to be disposed between the first transfer module 100 and the second transfer module 200.

In more detail, in the exemplary embodiment, the third transfer module 400 may be configured to include an upper transfer unit 410 and a lower transfer unit 420.

The upper transfer unit 410 may transfer the object to be transferred by contacting the top of the object to be transferred above the object to be transferred and the lower transfer unit 420 may transfer the object to be transferred by contacting the bottom of the object to be transferred below the object to be transferred.

The upper transfer unit 410 may be configured in such a manner that a plurality of rollers 412 which rotates is provided, a belt 414 having a form to wholly cover the rollers 412 is provided, and the belt 414 rotates together with the rotation of the roller 412.

That is, the upper transfer unit 410 may be configured in such a manner that one surface of the belt 414 contacts the top of the object to be transferred and the object to be transferred moves along the belt 414 by the rotation of the belt 414.

Further, the lower transfer unit 420 may also be configured in such a manner that a plurality of rollers 422 is provided, a belt 424 wholly covering the rollers 422 is provided, and the object to be transferred moves along the belt 424 by the rotation of the belt 424, similarly to the upper transfer unit 410.

Accordingly, the object to be transferred may be transferred with movement of the belt of each component in a form in which the object to be transferred is wedged between the upper transfer unit 410 and the lower transfer unit 420.

In this case, the upper transfer unit 410 and the lower transfer unit 420 may be advantageously formed to mutually move so as to selectively contact the object to be transferred.

That is, the upper transfer unit 410 moves upward at a portion where the object to be transferred is transferred to be spaced apart from the object to be transferred, the lower transfer unit 420 moves downward at the portion where the object to be transferred is transferred to be spaced apart from the object to be transferred, and the third transfer module 400 may be selectively used in the course of transferring the object to be transferred.

Further, the third transfer module 400 may be advantageously formed to have a relatively smaller width than the first transfer module 100 and the second transfer module 200.

That is, the belts 414 and 424 provided in the third transfer module 400 may be formed to have a relatively smaller width than the first transfer module 100 and the second transfer module 200.

In addition, the third transfer module 400 may be advantageously configured to move in the transverse direction similarly to the first transfer module 100 and the second transfer module 200.

By using the transfer apparatus according to the present invention, which includes the components, a user may achieve an effect to transfer the object to be transferred by various methods and easily perform management and maintenance of the transfer apparatus.

First Use Aspect of Transfer Apparatus

Subsequently, a first use aspect of the transfer apparatus according to the exemplary embodiment of the present invention will be described in detail with reference to FIGS. 5 to 8.

Herein, FIGS. 5 to 8 are diagrams illustrating a first use aspect of the transfer apparatus according to the exemplary embodiment of the present invention.

The first use aspect of the transfer apparatus according to the exemplary embodiment of the present invention relates to a component that transfers an object B to be transferred while rotating the object B to be transferred and in present use aspect, a plurality of transfer apparatuses may be configured to be connected to each other in series.

In this case, the transfer apparatus provided at the front end among the plurality of transfer apparatuses connected in series includes a first transfer module 100*a* and a second transfer module 200*a* and the transfer apparatus provided at the rear end may include a first transfer module 100*b* and a second transfer module 200*b*.

First, as illustrated in FIG. 5, the object B to be transferred may be held on the top of the transfer apparatus provided at the front end among the plurality of transfer apparatuses connected in series.

The object to be transferred is held on the tops of the first transfer module 100*a* and the second transfer module 200*a* and the first transfer module 100*a* and the second transfer module 200*a* may transfer the object B to be transferred together.

In this case, the first speed at which the first transfer module 100*a* transfers the object B to be transferred and the second speed at which the second transfer module 200*a* transfers the object B to be transferred may be se to be different from each other.

In the exemplary embodiment, the first speed is set to be relatively higher than the second speed, and as a result, the speed at which the first transfer module 100*a* transfers the object B to be transferred may be configured to be higher than the speed at which the second transfer module 200*a* transfers the object B to be transferred.

Since one side of the object B to be transferred is held on the top of the first transfer module 100*a* and the other side is held on the top of the second transfer module 200*a*, one side of the object B to be transferred may be transferred relatively rapidly.

Accordingly, as illustrated in FIG. 6, one side of the object B to be transferred, which is held on the top of the first transfer module 100*a* is transferred to further the rear end than the other side, and as a result, the object B to be transferred may be transferred while rotating.

In this case, when the object B to be transferred rotates as you want, the first speed and the second speed may be advantageously set so that the object B to be transferred reaches the rear end of the transfer apparatus provided at the front end.

Further, during such a process, the upper transfer unit and the lower transfer unit of the third transfer module may advantageously move to be spaced apart from the object B to be transferred.

The object B to be transferred, of which the rotation is completed may be transferred to the tops of the first transfer module 100*b* and the second transfer module 200*b* of the transfer apparatus provided at the rear end as illustrated in FIG. 7.

In this case, the center of gravity of the object B to be transferred, which rotates may not be positioned at the center of the transfer apparatus according to the present invention according to the form and the layout of the object B to be transferred.

In this case, when the object B to be transferred is transferred to the tops of the first transfer module 100*b* and the second transfer module 200*b* of the transfer apparatus positioned at the rear end, the first transfer module 100*b* and the second transfer module 200*b* may move in the transverse direction so that the center of the object B to be transferred is positioned at the center of the transfer apparatus.

In such a configuration, in the course of transferring the object B to be transferred, which rotates, to the transfer apparatus at the rear end, an effect to prevent the object B to be transferred from being transferred only to the top of any one of the first transfer module 100*b* and the second transfer module 200*b* may be achieved.

Further, an effect in which the object B to be transferred is evenly disposed on the tops of the first transfer module 100*b* and the second transfer module 200*b* to be stably transferred may be achieved.

Herein, in the first transfer module 100*b* and the second transfer module 200*b*, as illustrated in FIG. 8, the first speed and the second speed are set to be the same as each other, and as a result, the object B to be transferred may be transferred while a layout of the object B to be transferred which rotates is maintained.

Meanwhile, during such a process, the blowing module of the transfer apparatus according to the present invention may advantageously cause the air to flow downward.

In such a configuration, an effect to absorb the object B to be transferred downward may be achieved, and as a result, the object B to be transferred may be further closely attached to the first transfer modules 100*a* and 100*b* and the second transfer modules 200*a* and 200*b*.

Accordingly, the first transfer modules 100*a* and 100*b* and the second transfer modules 200*a* and 200*b* of the transfer apparatus according to the present invention may more easily transfer the object B to be transferred and more precisely control a transfer state of the object B to be transferred.

Through such a process, the user may achieve effects of controlling a transfer layout such as rotating the object B to be transferred in the course of transferring the object B to be transferred by using the transfer apparatus according to the present invention, and the like.

Therefore, the object B to be transferred is transferred in various layouts according to characteristics of the object B to be transferred and a transfer time of the object B to be transferred is shortened to enhance productivity.

Second Use Aspect of Transfer Apparatus

Subsequently, a second use aspect of the transfer apparatus according to the exemplary embodiment of the present invention will be described in detail with reference to FIGS. 9 to 10.

Herein, FIGS. 9 and 10 are diagrams illustrating a second use aspect of the transfer apparatus according to the embodiment of the present invention.

The second use aspect of the transfer apparatus according the present invention may be configured to just transfer the object B to be transferred.

First, as illustrated in FIG. 9, the object B to be transferred may be held on the tops of the first transfer module 100 and the second transfer module 200 of the transfer apparatus.

Further, the upper transfer unit 410 of the third transfer module 400 moves downward and the lower transfer unit 420 moves upward to contact the object B to be transferred between the upper transfer unit 410 and the lower transfer unit 420.

In this case, the belts of the upper transfer unit 410 and the lower transfer unit 420 rotate to provide power to transfer the object B to be transferred.

That is, the third transfer module 400 completely takes charge of transferring the object B to be transferred and the first transfer module 100 and the second transfer module 200 may not transmit the transfer power to the object B to be transferred.

Herein, as illustrated in FIG. 10, the blowing module 300 may cause the air to flow to the top.

When the blowing module 300 causes the air to flow upward, the object B to be transferred is pushed upward by receiving resistance and since the center of the object B to be transferred is fixed between the third transfer modules 400, only both sides of the object B to be transferred may be pushed upward.

Accordingly, both sides of the object B to be transferred are spaced apart from the first transfer module 100 and the second transfer module 200 not to contact each other.

In this case, each of the first transfer module 100 and the second transfer module 200 moves outside in the transverse direction to advantageously increase a distance between the first transfer module 100 and the second transfer module 200.

In the course of transferring the object B to be transferred by using the roller or belt, the surface of the roller or the belt is abraded, and as a result, the roller or the belt needs to be periodically replaced and abrasion of the first transfer module 100 and the second transfer module 200 is reduced through such a process to reduce management and maintenance cost of the transfer apparatus.

Further, even when the belt of the third transfer module 400 is abraded, the third transfer module 400 has a relatively smaller width than the first transfer module 100 and the second transfer module 200, and thus cost required for replacing the belt is small.

That is, only the third transfer module 400 is used in the course of just transferring the object B to be transferred, and thereby reduce cost required for transferring the management and maintenance of the transfer apparatus simultaneously with transferring the object B to be transferred.

Third Use Aspect of Transfer Apparatus

Subsequently, a third use aspect of the transfer apparatus according to the exemplary embodiment of the present invention will be described in detail with reference to FIGS. 11 to 13.

Herein, FIGS. 11 to 13 are diagrams illustrating a third use aspect of the transfer apparatus according to the exemplary embodiment of the present invention.

The third use aspect of the transfer apparatus according to the exemplary embodiment of the present invention relates to a component that transfers and collect a plurality of objects B to be transferred and in the present use aspect, a plurality of transfer apparatuses may be configured to be connected to each other in series.

In this case, the transfer apparatus provided at the front end among the plurality of transfer apparatuses connected in series includes the first transfer module 100a and the second transfer module 200a and the transfer apparatus provided at the rear end may include the first transfer module 100b and the second transfer module 200b.

First, as illustrated in FIG. 11, the object B to be transferred may be held on the top of the transfer apparatus provided at the front end among the plurality of transfer apparatuses according to the present invention, which are connected in series.

In this case, each of the first transfer module 100a and the second transfer module 200a of the transfer apparatus provided at a front end moves outside in the transverse direction, and as a result, an interval between the first transfer module 100a and the second transfer module 200a may increase.

Separate objects B to be transferred may be disposed while being provided on the tops of the first transfer module 100a and the second transfer module 200a, respectively.

Further, the first speed and the second speed of the first transfer module 100a and the second transfer module 200a are set to be the same as each other, and as a result, the objects B to be transferred, which are disposed in the first transfer module 100a and the second transfer module 200a, respectively may be transferred at the same speed.

In this case, the blowing module 300 provided in the first transfer module 100a and the second transfer module 200a causes the air to flow downward to advantageously stably fix and transfer the objects B to be transferred, which are disposed in the first transfer module 100a and the second transfer module 200a, respectively.

In addition, since the first transfer module 100a and the second transfer module 200a are spaced apart from each other, the objects B to be transferred, which are disposed in the first transfer module 100a and the second transfer module 200a, respectively may be disposed to protrude between the first transfer module 100a and the second transfer module 200a.

Various operations may be performed with respect to the objects B to be transferred, which are transferred during such a process.

Processing of modifying the object B to be transferred may be performed and an operation such as applying a bonding agent for bonding both objects B to be transferred, or the like may be performed.

In the present user aspect, since the first transfer module 100a and the second transfer module 200a are disposed while being spaced apart from each other, various devices required for such a process may be provided in a space between the first transfer module 100a and the second transfer module 200a.

That is, the first transfer module 100a and the second transfer module 200a are configured to separately move in the transverse direction to secure a space required for processing the object B to be transferred.

The object B to be transferred, which is processed during such a transfer process, may be transferred from the transfer apparatus provided at the front end to the transfer apparatus provided at the rear end as shown in the FIG. 12.

During such a process, both objects B to be transferred may contact each other by a need of bonding both objects B to be transferred to each other, or the like.

In this case, the transfer apparatus may advantageously further include a guide module 500 of which the width decreases in a direction in which the object B to be transferred is transferred.

When the guide module 500 is configured so as to collect both objects B to be transferred at the center, the shape and the configuration of the guide module 500 are not limited to the exemplary embodiment, but may be diversified.

That is, in the case course of transferring the objects B to be transferred, which are transferred from the first transfer module 100a and the second transfer module 200a to the first transfer module 100b and the second transfer module 200b, the objects B to be transferred may be transferred while being close to each other by the guide module 500.

In this case, when both objects B to be transferred overlap with each other, a component that lifts up one-side object B to be transferred may be further included.

As described above, the component used for processing the object B to be transferred may adopt a component which is generally used and if the component is provided for various processing of the object B to be transferred, the component may be diversified without a limit.

The objects B to be transferred, which contact each other during such a process may be transferred through the first transfer module 100b and the second transfer module 200b as illustrated in FIG. 13.

In this case, the first transfer module 100b and the second transfer module 200b are disposed to be close to each other to advantageously transfer the object B to be transferred more stably.

Alternatively, like the second use aspect, the object B to be transferred may be transferred by using the third transfer module of the transfer apparatus provided at the rear end without using the configurations of the first transfer module 100b and the second transfer module 200b.

Through the aforementioned method, the plurality of objects B to be transferred are transferred and processing the objects B to be transferred is performed by using the transfer apparatus according to the present invention.

That is, since various operations may be performed with respect to the objects B to be transferred during transferring the objects b to be transferred, efficiency of various operations may be enhanced.

In particular, when the transfer apparatus according to the present invention is used for manufacturing the articles, productivity may be significantly enhanced.

All use aspects are not only individually performed, and various use aspects may be combined and used according to characteristics and purposes of the objects to be transferred.

That is, the objects to be transferred are transferred and various types of objects to be transferred are transferred, processed, or rotated by various methods by using the transfer apparatus according to the present invention, that is, the transfer apparatus may be universally used.

The use aspect is not limited to the exemplary embodiment and if the use aspect includes the configurations in which the first transfer module 100 and the second transfer module 200 of the transfer apparatus according to the present invention may move in the transverse direction, the blowing module 300 influences the objects to be transferred, which are disposed on the tops of the first and second transfer modules 100 and 200, and the third transfer module 400 that has the relatively smaller width to selectively transfer the object B to be transferred, and the like, the use aspect may be variously applied.

Further, although the specific exemplary embodiments have been described and illustrated as above, the present invention is not limited to the exemplary embodiments described herein, and it would be apparent to those skilled in the art that various changes and modifications might be made to these embodiments without departing from the spirit and the scope of the invention. Accordingly, the changed example and modified examples should not be individually appreciated from the technical spirit or the viewpoint of the present invention and it should be appreciated that modified exemplary embodiments will be included in the appended claims of the present invention.

The invention claimed is:

1. A transfer apparatus comprising:
    a first transfer module holding an object to be transferred on the top thereof and transferring the object to be transferred at a first speed in a longitudinal direction;
    a second transfer module disposed in parallel with the first transfer module and holding the object to be transferred on the top thereof and transferring the object to be transferred at a second speed in the longitudinal direction;
    a blowing module causing air to flow upward/downward below at least one of the first transfer module and the second transfer module; and
    a third transfer module disposed in parallel with the first transfer module and the second transfer module and transferring the object to be transferred in the longitudinal direction, wherein
    the third transfer module has a relatively smaller width than the first transfer module and the second transfer module.

2. The transfer apparatus of claim 1, wherein the blowing module causes the air to flow downward while at least one of the first transfer module and the second transfer module transfers the object to be transferred.

3. The transfer apparatus of claim 1, wherein the first transfer module and the second transfer module are formed to move in a transverse direction.

4. The transfer apparatus of claim 1, wherein the first speed and the second speed of the first transfer module and the second transfer are set to be different from each other.

5. The transfer apparatus of claim 1, wherein the third transfer module is provided between the first transfer module and the second transfer module.

6. The transfer apparatus of claim 1, wherein the third transfer module includes a lower transfer unit transferring the object to be transferred by contacting the bottom of the object to be transferred and an upper transfer unit transferring the object to be transferred by contacting the top of the object to be transferred.

7. The transfer apparatus of claim 6, wherein the lower transfer unit and the upper transfer unit are formed to move upward/downward so as to selectively contact the object to be transferred.

8. The transfer apparatus of claim 1, wherein the blowing module causes the air to flow upward while the third transfer module transfers the object to be transferred.

9. The transfer apparatus of claim 1, further comprising:
    a guide module of which the width decreases in a direction in which the object to be transferred is transferred so that the objects to be transferred, which the first and second transfer modules transfer, contact each other.

* * * * *